April 5, 1938.   O. McCORMICK   2,112,858
DATA COMPUTER
Filed March 15, 1937    2 Sheets-Sheet 1

Inventor
Otis McCormick
By W. N. Roach
Attorney

April 5, 1938.    O. McCORMICK    2,112,858
DATA COMPUTER
Filed March 15, 1937    2 Sheets-Sheet 2
Fig-3-
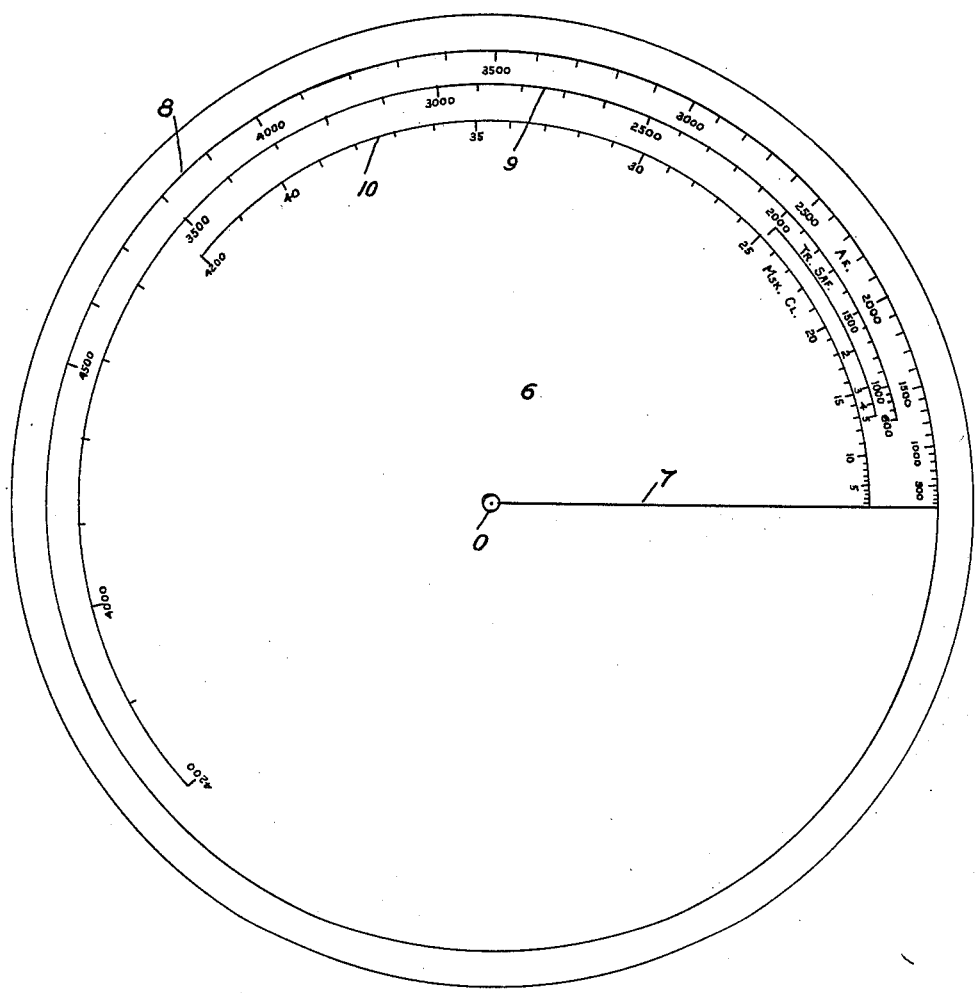
Inventor
Otis McCormick
By W. N. Roach
Attorney Patented Apr. 5, 1938

2,112,858

UNITED STATES PATENT OFFICE 2,112,858

DATA COMPUTER

Otis McCormick, United States Army, Fort Benning, Ga.

Application March 15, 1937, Serial No. 130,963

5 Claims. (Cl. 235—88)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a data computer intended primarily for computing necessary data for indirect fire control of machine guns.

The main objects of the invention are the provision of a simple and easily operated instrument for solving the various problems arising in the control of machine gun fire.

A practical embodiment of the invention is shown by way of illustration in the accompanying drawings, wherein, Fig. 1 is a plan view of a device constructed in accordance with the invention, the upper plate removed;

Fig. 3 is a plan view of the upper plate.

Figure 1:
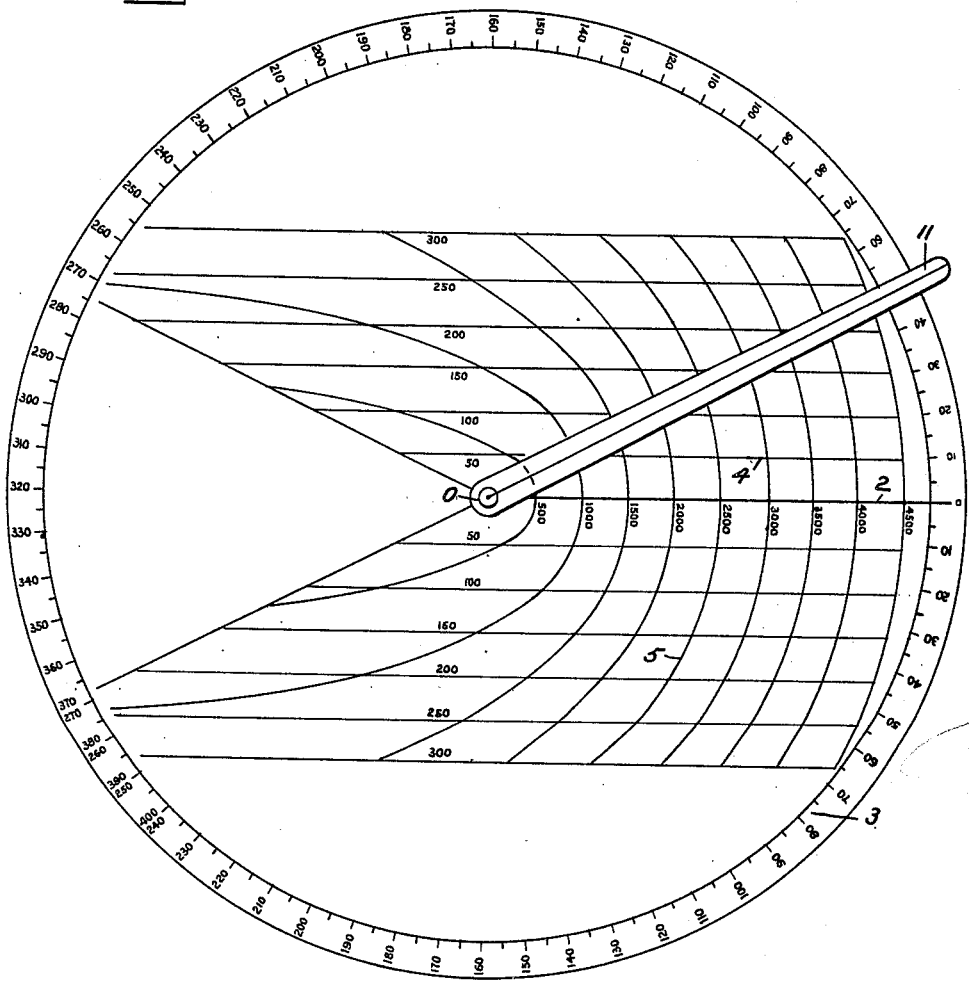
Figure 2:
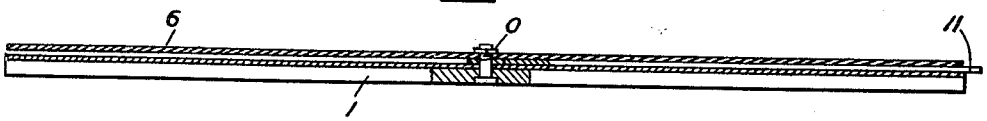
Fig. 2 is a cross sectional view of the device.

Referring to the drawings by characters of reference:

There is provided a base plate 1 upon which is a radially disposed index line 2 the outer end of which is the starting or zero division of a circular scale 3 formed with 640 equal divisions representing angles in mils. The divisions on the scale are numbered from the zero mark clockwise to 270 and from the same point counter clockwise to 400. The circular scale has the point of origin 0 of the index line 2 as its center.

Above and below the index line 2 and parallel to it is a series of equally spaced lines 4 representing differences of ground elevation or vertical intervals. These lines may be any selected distance depending only on the size of device desired. The space between two adjacent lines represents 10 yards difference in ground elevation; and a total of 300 yards difference of ground elevation is represented.

To facilitate reading each fifth line starting from the index line may be of a different color such as red.

With the point 0 as a point of origin, curves 5 are drawn intersecting the lines 4 and representing range in yards. As herein shown ranges up to 4500 yards are represented by these curved lines.

The lines 5 are plotted by computing the angle of site in mils for different ground elevations and ranges using the formula $$\text{Angle of site} = \frac{1000 \times \text{difference in ground elevation}}{\text{range}}$$

In the present instance 10 yards difference in ground elevation and range from 500 yards to 4500 were used. Having computed the angle of site for a given difference in ground elevation and range a straight edge is placed on the center point 0 and the angle of site on scale 3 and the point marked where this line crosses the line of difference in ground elevation which will be a point on the line 5 for that range.

It will be noted that, as illustrated in Fig. 1, only every fifth division lines 4 and 5 are shown in order to avoid confusion by reason of the multiplicity of lines which would be necessary in a restricted space.

Pivotally mounted on the base plate 1 at the point of origin 0 thereon is an upper plate 6 formed of any suitable transparent material, such as Celluloid, and from its pivotal point a radially disposed index line 7 is inscribed. From the index line 7 and extending counterclockwise are three concentric arcuate scales having the pivotal point as a center, the outer one 8 divided into hundreds of yards and extending to 4500 yards. This scale is so spaced that it will give readings of angles of gun elevation on the scale 3 of the base plate, when the index line 7 is set at zero. The center scale 9 is also graduated in hundreds of yards to 4200 yards and corresponds to minimum angles of gun elevation for troop safety. It will be noted that this scale 9 is double near the starting end, since safety angles decrease with increase of range from 100 to 600 yards and increase thereafter. The inner scale 10 is graduated in hundreds of yards to 4200 yards and corresponds to the minimum angles of elevation for mask clearance.

The scale 8 is constructed from range tables compiled for the particular guns and ammunition with which the device is to be used, as follows: From such range tables take the angles of elevation for different ranges, in this instance for ranges from 100 to 4500 yards at intervals of 100 yards. With the end of line 7 on the plate 6 coincident with the zero mark on scale 3 place a straight edge on the center 0 and each angle of elevation on the scale 3 in succession and mark the divisions thus found on the scale 8. These will give the proper ranges.

Plotting of the scales 9 and 10 is carried out in the same manner as plotting of the scale 8 the data being secured from tables of mask clearances and troop safety.

Also pivotally mounted at 0 is a pointer 11, preferably positioned between the lower plate 1 and the upper plate 6, which may be used for reading divisions on the scale of the lower plate corresponding to divisions on the scales of the upper plate.

The device may be used for solving the following problems:

(1) To find the angle of site given the range to the target and difference of ground elevation proceed as follows:

Place the index line 7 of the upper plate 6 so that it passes through the intersection of the curved line 5 representing the given range with the line 4 representing the given difference in ground elevation. At the point where the index line 7 now cuts the scale 3 of the base plate read the angle of site. If the difference in ground elevation is minus, the index line 7 should be set at the proper intersection of lines 5 and 4 below the center line of the base plate, if plus, it should be set above.

(2) To find the difference of ground elevation, the range to the target and the angle of site being given proceed as follows:

Set the index line 7 of the upper plate on the graduation of the scale 3 on the base plate corresponding to the angle of site. Set it below zero if negative, and above if positive. Note the line 4 running through the point where the index line 7 intersects the curved line 5 representing the given range. This line 4 gives the required difference in ground elevation. If the point falls between two lines 4, the difference in ground elevation can be interpolated.

(3) To find the quadrant angle of gun elevation, given the difference in ground elevation and the range to the target proceed as follows:

Place the index line 7 of the upper plate so that it passes through the intersection of the curved line 5 representing the given range with the straight line 4 representing the difference in ground elevation. Note where the graduation on the scale 8 of the upper plate corresponding to the given range intersects the scale 3 on the lower plate. The reading on this scale 3 is the required quadrant angle of gun elevation.

(4) To find the quadrant angle of gun elevation, given the angle of site and the range to the target proceed as follows:

Set the index line 7 of the upper plate on the graduation on the scale 3 of the lower plate that corresponds to the given angle of site. Note where the graduation on the scale 8 corresponding to the given range intersects the scale 3 on the lower plate. The reading on the scale 3 is the required quadrant angle of gun elevation.

(5) To find the limit of troop safety, given the range to the troops, and either the angle of site or the difference in ground elevation.

In the first instance set the index line 7 of the upper plate on the graduation on the scale 3 of the lower plate corresponding to the given angle of site. Note where the graduation of the scale 9 on the upper plate corresponding to the given range intersects the scale 3 of the lower plate. The reading on the scale 3 will give the required quadrant angle of gun elevation to assure troop safety.

In the second instance place the index line 7 of the upper plate so that it passes through the intersection of the curved line 5 corresponding to the given range with the right line 4 corresponding to the given difference in ground elevation. Note where the graduation on the scale 9 of the upper plate corresponding to the given range intersects the scale 3 on the lower plate. The reading on the scale 3 is the quadrant angle of gun elevation required for troop safety.

(6) To find the limit of mask clearance, given the range to the mask and either the difference in ground elevation or the angle of site:—

In the first instance place the index line 7 of the upper plate so that it passes through the intersection of the curved line 5 corresponding to the given range with the right line 4 corresponding to the given difference in ground elevation. Note where the graduation on the scale 10 of the upper plate corresponding to the given range intersects the scale 3 on the lower plate. The reading on the scale 3 is the required quadrant angle of gun elevation for mask clearance.

In the second instance set the index line 7 of the upper plate on the graduation on the scale 3 of the lower plate corresponding to the given angle of site. Note where the graduation on the scale 10 on the upper plate corresponding to the given range intersects the scale 3 on the lower plate. The reading on scale 3 will give the quadrant angle of gun elevation required for mask clearance.

I claim:—

1. A fire data computer embodying a base plate, an index line inscribed on said plate, a circular scale inscribed on the plate with the outer end of the index line as zero, the scale having 640 divisions representing angles in mils, the divisions numbered clockwise from zero to 270 and counterclockwise to 400, spaced lines inscribed on the plate parallel to the index line and representing differences in ground elevation, curved lines intersecting said spaced lines and representing range, an upper plate pivotally mounted on the base plate, an index line inscribed on said plate and extending radially from the pivot point, and concentric arcuate scales inscribed on said upper plate and extending counterclockwise from the index line, the outermost of said scales representing range in yards, the second of said scales representing in yards the minimum range for troop safety and the innermost of said scale representing in yards the minimum range for mask clearance.

2. A fire data computer embodying a base plate, a circular scale inscribed on said plate, an index line extending from the center of said circular scale to the zero point thereon, equally spaced lines on each side of the index line and parallel thereto inscribed on said plate indicating differences in ground elevation, curved lines with the center point as a generatrix intersecting the aforesaid lines and indicating range, an upper plate pivotally mounted on the base plate at the center of the circular scale, an index line inscribed on said upper plate, and concentric scales struck from the pivot point as a center on said upper plate and indicating in yards respectively range, minimum range for troop safety and minimum range for mask clearance.

3. A fire data computer embodying a base plate, a circular scale inscribed on said plate, an index line extending from the center of said circular scale to the zero point thereon, equally spaced lines parallel to the index line inscribed on said plate indicating differences in ground elevation, curved lines intersecting the parallel lines indicating range, an upper plate pivotally mounted on the base plate at the center of the circular scale, an index line inscribed on said upper plate, and an arcuate scale on said upper plate graduated in yards of range corresponding to angles of gun elevation on the scale of the base plate.

4. A fire data computer embodying a base plate, a circular scale inscribed on said plate, an index line extending from the center of said scale to the zero point thereon, equally spaced lines parallel to the index line inscribed on said plate indicating differences in ground elevation; curved lines intersecting the spaced lines indicating range, an upper plate pivotally mounted on the base plate at the center of the circular scale, an index line inscribed on said upper plate, and an arcuate scale on said upper plate graduated in yards of range corresponding to minimum angles of gun elevation for troop safety on the scale of the base plate.

5. A fire data computer embodying a base plate, a circular scale inscribed on said plate, an index line extending from the center of the scale to the zero point thereon, equally spaced lines inscribed on said plate parallel to the index line indicating differences in ground elevation, curved lines intersecting the parallel lines indicating range, an upper plate pivotally mounted on the base plate at the center of the circular scale, an index line inscribed on said upper plate, and an arcuate scale on said upper plate graduated in yards of range to correspond to minimum angles of gun elevation for mask clearance on the scale of the base plate.

OTIS McCORMICK.